United States Patent [19]

Reddy et al.

[11] Patent Number: 5,292,470

[45] Date of Patent: Mar. 8, 1994

[54] CONVECTIVE LEACHING OF POLYBENZAZOLE FILMS

[75] Inventors: Lalitha Reddy, Walnut Creek; Willie E. Rochefort, Hercules; Ming-Biann Liu, Clayton; Peter E. Pierini, Berkeley, all of Calif.

[73] Assignee: The Dow Chemical Company, Midland, Mich.

[21] Appl. No.: 848

[22] Filed: Jan. 5, 1993

[51] Int. Cl.$^5$ .............................................. B29C 71/02
[52] U.S. Cl. ................................... 264/169; 264/184; 264/233; 264/331.11; 264/331.12; 264/344; 528/183
[58] Field of Search ............... 264/169, 233, 344, 184, 264/211.15, 211.16, 331.11, 331.12; 528/183

[56] References Cited

U.S. PATENT DOCUMENTS

| | | | |
|---|---|---|---|
| 3,584,104 | 6/1971 | Bohrer et al. | 264/233 |
| 3,699,038 | 10/1972 | Boom | 264/216 |
| 3,760,054 | 9/1973 | Moulds . | |
| 4,263,245 | 4/1981 | Tan . | |
| 4,377,546 | 3/1983 | Helminiak et al. . | |
| 4,606,875 | 8/1986 | Chenevey et al. | 264/331.12 |
| 4,717,619 | 1/1988 | Letinski | 264/331.11 |
| 4,845,150 | 7/1989 | Kovak et al. . | |
| 4,898,924 | 2/1990 | Chenevey et al. | 264/184 |
| 4,927,909 | 5/1990 | Wadhwa et al. | 264/331.12 |
| 4,973,442 | 11/1990 | Harvey et al. | 264/108 |
| 4,977,223 | 12/1990 | Arnold et al. | 264/331.12 |
| 5,102,601 | 4/1992 | Farris et al. | 264/108 |
| 5,164,131 | 11/1992 | Chau et al. | 264/184 |

FOREIGN PATENT DOCUMENTS

| | | |
|---|---|---|
| 6328530 | 2/1986 | Japan . |
| 62-53339 | 3/1987 | Japan . |
| 63-74612 | 4/1988 | Japan . |
| 63-210138 | 8/1988 | Japan . |
| 393011 | 4/1972 | United Kingdom . |

*Primary Examiner*—Jeffery Thurlow

[57] ABSTRACT

Films made from polybenzazole dopes can quickly be leached to remove polyphosphoric acid and other residual solvents by passing a leaching fluid such as steam through pores in the wet, never dried film. The process can reach acceptable residual phosphorous levels (1500–2000 ppm) in as little as about 2 or 3 minutes.

19 Claims, No Drawings

CONVECTIVE LEACHING OF POLYBENZAZOLE FILMS

BACKGROUND OF THE INVENTION

This application relates to the art of leaching residual solvents from polybenzazole films. For the purposes of this application, the term "film" refers to both thin film (usually at most about 10 to 15 mil thick) and to sheet (usually more than about 10 to 15 mil thick).

It is well-known to polymerize polybenzazole polymers in acid solutions, so that an acid dope is formed. See, e.g., Wolfe et al., U.S. Pat. No. 4,533,693 (Aug. 5, 1985) which is incorporated herein by reference. Frequently, the resulting polymers are not thermoplastic. However, they can made into films by: (a) extruding the desired film out of the dope; (b) optionally stretching the dope; (c) coagulating the polymer from the dope; and (d) leaching the residual solvent (usually phosphoric acid) out of the film. See, e.g., Harvey et al., U.S. Pat. No. 4,973.442 (Nov. 27, 1990) which is incorporated herein by reference.

The leaching step can become a significant bottleneck in a continuous production process, because it is very time consuming. Commercially desirable films should contain no more than about 2000-2500 ppm phosphorus, and film for very sensitive uses should contain about 250 ppm phosphorus or less. On the other hand, the Harvey patent shows that film washed in water for 5 minutes contains 4 weight percent phosphorus, and film washed for 48 hours still contains 0.8 weight percent phosphorus (8000 ppm). The long leaching times needed to reach acceptable levels of phosphorus are unmanageable in a commercial production.

What is needed is an accelerated process to leach residual solvent from polybenzazole films.

SUMMARY OF THE INVENTION

One aspect of the present invention is a process to leach residual solvent from a polybenzazole film that has two faces, comprising the step of contacting one face of the wet, never-dried polybenzazole film with a leaching fluid, that is capable of removing residual solvent from the film, at a pressure higher than the pressure on the other face of the film such that the leaching fluid passes through the film from one face to the other, whereby a polybenzazole film containing no more than about 2000 ppm phosphorus is formed.

A second aspect of the present invention is a polybenzazole film containing on average from about 1 to about 250 ppm phosphorus.

The process of this invention makes films with low phosphorus content in a relatively short time. At optimum conditions, it can make films with acceptable phosphorus levels (no more than about 2000 ppm) in about 5 minutes or less, or it can make films with very low phosphorus (100 ppm or less) in slightly longer time (about 30 minutes to 2 hours). The films can be used in electronic and structural applications.

DETAILED DESCRIPTION OF THE INVENTION

The present invention uses polybenzoxazole (PBO) or polybenzothiazole (PBT) polymers or copolymers that are polymerized in a mixture containing polyphosphoric acid. PBO, PBT and random, sequential and block copolymers of PBO and PBT are described in references such as Wolfe et al., *Liquid Crystalline Polymer Compositions, Process and Products*, U.S. Pat. No. 4,703,103 (Oct. 27, 1987); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985): Evers, *Thermo-oxadatively Stable Articulated p-Benzobisoxazole and p-Benzobisthiazole Polymers*, U.S. Pat. No. 4,359,567 (Nov. 16, 1982): Tsai et al., *Method for Making Heterocyclic Block Copolymer*, U.S. Pat. No. 4,578,432 (Mar. 25, 1986): 11 Ency. Poly. Sci. & Eng., *Polybenzothiazoles and Polybenzoxazoles*, 601 (J. Wiley & Sons 1988) and W. W. Adams et al., The *Materials Science and Engineering of Rigid-Rod Polymers* (Materials Research Society 1989), which are incorporated herein by reference.

The polymer may contain AB-mer units, as represented in Formula 1(a), and/or AA/BB-mer units, as represented in Formula 1(b)

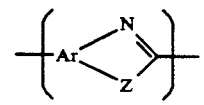

1(a) AB

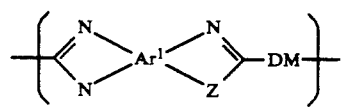

1(b) AA/BB wherein:
Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.
Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra. at 602, which is incorporated herein by reference.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably a lyotropic liquid-crystalline polymer, which forms liquid crystalline domains in solution when its concentration exceeds a "critical concentration point." It is preferably rigid rod in the case of an AA/BB-PBZ polymer or semi-rigid in the case of an AB-PBZ polymer. Azole rings within the polymer are preferably oxazole rings (Z=0). Preferred mer units are illustrated in Formulae 2 (a)–(h). The polymer more preferably consists essentially of mer units selected from those illustrated in 2(a)–(h), and most preferably consists essentially of a number of identical units selected from those illustrated in 2(a)–(d).

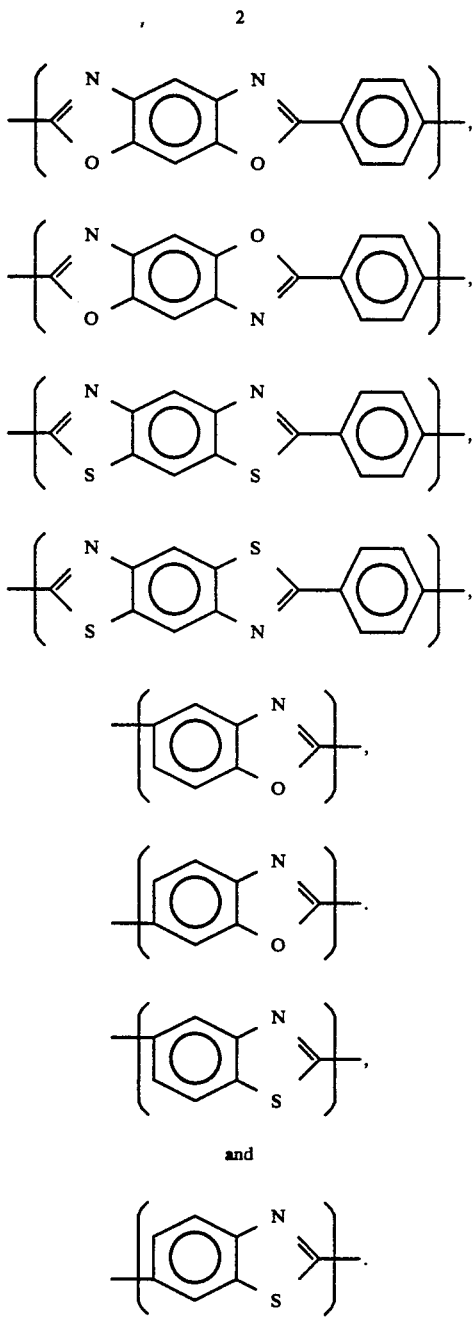

Each polymer preferably contains on average at least about 25 mer units, more preferably at least about 50 mer units and most preferably at least about 100 mer units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 50 dL/g. The intrinsic viscosity of semi-rigid AB-PBZ polymers is preferably at least about 5 dL/g, more preferably at least about 10 dL/g and most preferably at least about 15 dL/g.

The polymer is dissolved in a dope solution that contains the polymer and a solvent. The solvent is usually acidic. It preferably contains methanesulfonic acid or polyphosphoric acid, and it is more preferably polyphosphoric acid.

The dope should contain a high enough concentration of polymer for the polymer to coagulate to form a solid film. When the polymer is lyotropic liquid-crystalline, then the concentration of polymer in the dope is preferably high enough to provide a liquid-crystalline dope. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985): Sybert et al., U.S. Pat. No. 4,772,678 (Sep. 20, 1988): Harris, U.S. Pat. No. 4,847,350 (Jul. 11, 1989); and Gregory et al., U.S. Pat, No. 5,089,591 (Feb. 18, 1992), which are incorporated herein by reference. In summary, suitable monomers (AA-monomers and BB-monomers or AB–monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

The dope is formed into a film. For instance, films can be shaped by extruding the dope through a slit or tubular die and optionally stretching the dope film in the machine and/or transverse directions. Examples of suitable processes are shown in Harvey et al., U.S. Pat. No. 4,973,442 (Nov. 27, 1990): Chenevey et al., U.S. Pat. No. 4,898,924 (Feb. 6, 1990); and Pierini et al., U.S. application Ser. No. 937,327 (filed Aug. 27, 1992), which are incorporated herein by reference.

The film is preferably coagulated before the leaching step by contacting it with a coagulant fluid that precipitates the polybenzazole polymer from solution and removes a part of the solvent. (The term "coagulation" is commonly used in the art to describe the step in which dope is initially contacted with a fluid that precipitates the polymer from solution and removes part of the solvent. The term "leaching" is commonly used in the art to describe the step of subsequently washing almost all of the residual solvent from the coagulated polymer. The term "coagulation" does not necessarily imply that the dope film is in a flowable state. The dope may be at a temperature low enough so that the dope is essentially non-flowing before the coagulation step begins.)

Steam, water or an aqueous acid solution are all examples of suitable coagulant fluids. The coagulant fluid is preferably an aqueous acid solution. The aqueous acid solution is more preferably an aqueous phosphoric acid solution. The solution preferably contains at least about 10 weight percent acid, more preferably at least about 20 weight percent acid, and most preferably at least about 25 weight percent acid. It preferably contains no more than about 50 weight percent acid, and more preferably no more than about 35 weight percent acid. The aqueous acid solution may be at any temperature at which it is liquid (usually about 0°–100° C.). Its temperature is preferably at least about 5° C. and more preferably at least about 25° C. Its temperature is preferably no more than about 85° C. and more preferably no more than about 45° C.

The coagulant fluid may be applied in any manner usual for washing films, such as by immersing or spraying The residence time is preferably no more than about 15 minutes, more preferably no more than about 10 minutes, more highly preferably no more than about 5 minutes and most preferably no more than about 1 minute. It preferably reduces the residual solvent in the film to no more than about 25 weight percent, more preferably no more than about 15 weight percent and most preferably no more than about 5 weight percent.

The film may optionally go through subsequent washing steps before it undergoes convective leaching of the present invention. Those steps may be carried out using known washing fluids, such as water, steam or acid solutions which contain less acid than the coagulant fluid.

It is important that the surface of the film should not be allowed to dry at any time after the coagulation step starts and before the leaching step is completed. It is theorized, without intending to be bound, that the wet never-dried surface of the polybenzazole film is relatively porous and provides paths to leach residual solvent from inside the film. This discovery is surprising in light of the high barrier properties reported for dried polybenzazole films. On the other hand, it is theorized that the pores close when they become dry and do not open even when they become wet again. The closed pores trap residual solvent inside the film.

After it has been solidified so that it will not tear or deform, the film undergoes convective leaching by contact with a leaching fluid that is capable of removing residual solvent from the film. Examples of suitable leaching fluids include water, liquid organic solvents and steam.

The leaching fluid may be at any temperature at which it remains fluid (such as about 0° C.–100° C. for water). However, the leaching fluid is preferably at an elevated temperature. The temperature of water is preferably at least about 60° C., more preferably at least about 75° C. and most preferably at least about 85° C. The temperature of steam is preferably at least about 100° C., more preferably at least about 150° C. and most preferably at least about 200° C. The temperature of organic solvents is preferably at least about 75° C., more preferably at least about 100° C., more highly preferably at least about 150° C. and most preferably at least about 200° C. The maximum temperature is not critical to the invention and depends on practical limitations. It should be low enough that the polybenzazole polymer and the hot fluid do not decompose. Preferably, when the hot fluid is a liquid, the temperature is low enough that the liquid does not boil.

An organic solvent should be selected so that it remains liquid under reaction conditions. Its boiling point is preferably at least about 100° C., more preferably at least about 150° C. and most preferably at least about 200° C. at about atmospheric pressure. It preferably meets at least one of the following qualities: solubility in water of greater than one weight percent, high polarity, and/or ability to form addition complexes with the residual polymerization solvent. Examples of suitable hot organic solvents include: dimethyl sulfoxide, ethylene glycol, propylene carbonate, glycerol and hexyl alcohol.

The leaching fluid is contacted with one face of the film at a pressure that is higher than the pressure on the other face of the film, so that fluid passes through the film from one face to the other. When the film is in a tubular shape, this can be accomplished by putting the fluid inside the tube under pressure. When the film is flat, then is preferably placed in an apparatus that can create a high pressure zone on one side of the film (and/or pull a reduced pressure on the other side of the film). One face of the film can optionally be open to the atmosphere, but the exposed face of the film should be kept sufficiently wet to prevent the pores on the film from closing.

The pressure difference across the film should be chosen to move the fluid through the film at a desired rate without damaging the film. The optimal pressure varies depending upon the thickness and porosity of the film. The pressure difference across the film is usually between about 0.1 atm and about 50 atm. For most films, the pressure difference is preferably at least about 1 atm, more preferably at least about 3 atm and most preferably at least about 5 atm. It is preferably no more than about 25 atm, and more preferably no more than about 10 atm. The leaching process may optionally contain more than one convective leaching zone with more than one pressure and/or with different leaching fluids.

The residence time in the convective leaching zone is preferably no more than about 30 minutes, highly preferably no more than about 20 minutes, more preferably no more than about 10 minutes, more highly preferably no more than about 5 minutes and most preferably no more than about 2 minutes. The total residence time for the entire coagulation, washing and leaching process is preferably no more than about 35 minutes, highly preferably no more than about 25 minutes, more preferably no more than about 15 minutes, more highly preferably no more than about 10 minutes and most preferably no more than about 5 minutes. However, longer times may be desirable to obtain very low levels of residual solvent.

The leached film contains high quantities of the leaching fluid, frequently more than 50 weight percent. After the leaching process is completed, it may optionally be dried and heat-treated according to known methods, such as those described in Harvey et al., U.S.

Pat. No. 4,973,442 (Nov. 27, 1990) and Chenevey et al., U.S. Pat. No. 4,898,924 (Feb. 6, 1990), which are incorporated herein by reference. For example, it may be dried in a vacuum or circulating oven, preferably under sufficient tension in the transverse and machine directions to prevent shrinkage or curling. The dried film may be a thin film or a thicker sheet, as previously described. Films can be used in structural applications such as honeycomb, as a layer in a circuit board, or as a magnetic media substrate.

The residual solvent content of the film varies depending upon the time and the leaching conditions. When the residual solvent was a polyphosphoric acid related compound, the film preferably contains no more than about 1500 ppm phosphorus after a short leaching process, more preferably no more than about 1000 ppm and most preferably no more than about 500 ppm. For a somewhat longer leaching process, it preferably contains no more than about 200 ppm, more preferably no more than about 150 ppm, more highly preferably no more than about 100 ppm and most preferably no more than about 50 ppm. (Residual phosphorus measurements are based upon the weight of the film after it has been substantially dried. Phosphorus can be measured using an X-ray fluorescence technique described in E. P. Bertin, *Principles and Practice of X-Ray Spectrometric Analysis—Second Ed.* (Plenum Press 1984), which is incorporated herein by reference. Suitable equipment is commercially available under the tradename KEVEX 770 XRF and from Philips Electronic Instruments.)

The dried and heat-treated film may have biaxially balanced properties or uniaxially unbalanced properties. The tensile strength of a biaxially balanced film is preferably at least about 35 Ksi (1 Ksi = 1000 psi) and more preferably at least about 65 Ksi. The tensile modulus is preferably at least about 2 Msi (1 Msi = 1,000,000 psi) and more preferably at least about 5 Msi.

The invention is further illustrated by the following illustrative examples:

ILLUSTRATIVE EXAMPLES

The following examples are for illustrative purposes only, and should not be taken as limiting the scope of either the specification or the claims. Unless otherwise stated, all parts and percentages are by weight. (PPM = parts per million by weight)

Residual phosphorus is measured using X-ray fluorescence (XRF) on 1.25 inch diameter samples cut from the film.

EXAMPLE 1

Convective Steam Leaching Process

Dope films that contain about 14 weight percent cis-PBO (about 32 I.V. in methanesulfonic acid at 25° C.) are extruded. The dope films are stretched to 5 times their original length and width. The stretched film thickness is about 2 mil. The stretched films are mounted on hoops and immersed for 5 minutes in an aqueous phosphoric acid solution having the concentration shown in Table 1. The films are washed for 5 minutes in room temperature deionized water.

Samples of film are mounted in a high pressure filter assembly, making sure that the film remains wet throughout. The holder is positioned with the exit up at a 45° angle from horizontal. Steam at 40–45 psig and a temperature of about 150° C. is pumped into the entrance port, and condensate is drained periodically with a valve near the entrance port. Water is kept in the exit line to keep the back side of the film wet. Steam can be seen exiting through the exit side. After a period of time shown in Table I, the film is dried and phosphorus is measured. The results are shown in Table I.

TABLE I

| Sample | Percent Acid in 1st Bath (%) | Time under Steam (min.) | Residual Phosphorus (ppm) |
|---|---|---|---|
| a | 15 | 5 | 675 |
| b | 15 | 15 | 434 |
| c | 15 | 30 | 106 |
| d | 15 | 60 | 237 |
| e | 30 | 5 | 158 |
| f | 30 | 15 | 124 |
| g | 30 | 30 | 89 |
| h | 30 | 60 | 43 |

EXAMPLE 2

Convective Steam Leaching Process

Dope films that contain about 14 weight percent cis-PBO (about 32 I.V. in methanesulfonic acid at 25° C.) are extruded. The dope films are stretched to 5 times their original length and width. The stretched film thickness is about 2 mil. The stretched films are mounted on hoops and immersed for 3 to 4 days in room temperature water.

Samples of film are mounted in a high pressure filter assembly and steam is passed through the film as described in Example 1. After a period of time shown in Table II, the film is dried and phosphorus is measured. The results are shown in Table II.

TABLE II

| Sample | Time under Steam (min.) | Residual Phosphorus (ppm) |
|---|---|---|
| i | 15 | 296 |
| j | 30 | 197 |
| k | 60 | 153 |
| l | 120 | 138 |

What is claimed is:

1. A process to leach residual solvent from a polybenzazole film that has two faces, comprising the step of contacting one face of the wet, never-dried polybenzazole film with a fluid, that is capable of removing residual solvent from the film, at a pressure higher than the pressure on the other face of the film such that the fluid passes through the film from one face to the other, whereby a polybenzazole film containing no more than about 2000 ppm phosphorus is formed.

2. The process of claim 1 wherein the fluid is water or steam.

3. The process of claim 1 wherein the film contains no more than about 15 weight percent residual solvent.

4. A process to coagulate and leach a dope film that has two faces and contains polybenzazole polymer dissolved in polyphosphoric acid, said process comprising the steps of:

(1) contacting the dope film with a coagulant fluid; and (2) contacting one face of the wet, never dried polybenzazole film with a leaching fluid, that is capable of removing residual solvent from the film, at a pressure higher than the pressure on the other face of the film such that the fluid passes through the film from one face to the other, whereby a polybenzazole film containing no more than about 2000 ppm phosphorus is formed.

5. The process of claim 4 wherein the coagulant fluid is steam.

6. The process of claim 4 wherein the coagulant fluid is a liquid organic solvent.

7. The process of claim 4 wherein the coagulant fluid is a liquid aqueous fluid.

8. The process of claim 4 wherein the coagulant fluid is an aqueous acid solution.

9. The process of claim 8 wherein the aqueous acid solution contains 10 to 50 weight percent phosphoric acid.

10. The process of claim 4 wherein the leaching fluid is water.

11. The process of claim 10 wherein the water has a temperature of at least about 75° C.

12. The process of claim 4 wherein the leaching fluid is an organic solvent.

13. The process of claim 12 wherein the organic solvent is a polar organic solvent.

14. The process of claim 12 wherein the organic solvent has a temperature of at least about 100° C.

15. The process of claim 4 wherein the leaching fluid is steam.

16. The process of claim 16 wherein the steam has a temperature of at least about 150° C.

17. The process of claim 4 wherein the pressure difference across the film is at least about 1 atm.

18. The process of claim 4 wherein the total residence time in the process is no more than about 15 minutes.

19. A process to coagulate and leach a dope film that has two faces and contains polybenzazole polymer dissolved in polyphosphoric acid, said process comprising the steps of:
 (1) contacting the dope film with an aqueous solution that contains 10–50 weight percent phosphoric acid for no more than about 5 minutes: and
 (2) contacting one face of the wet, never dried polybenzazole film with steam at a pressure higher than the pressure on the other face of the film, such that the steam passes through the film from one face to the other, for no more than about 15 minutes,
whereby a polybenzazole film containing no more than about 2000 ppm phosphorus is formed.

* * * * *